US009066548B2

(12) United States Patent
Sturman et al.

(10) Patent No.: US 9,066,548 B2
(45) Date of Patent: Jun. 30, 2015

(54) JOINING STRETCHABLE FABRIC PORTIONS TO ONE ANOTHER

(71) Applicants: Richard Sturman, Nottinghamshire (GB); John Hales, Nottingham (GB)

(72) Inventors: Richard Sturman, Nottinghamshire (GB); John Hales, Nottingham (GB)

(73) Assignee: Montford Services Sdn. Bhd., Kowloon (HK)

( * ) Notice: Subject to any disclaimer, the term of this patent is extended or adjusted under 35 U.S.C. 154(b) by 0 days.

(21) Appl. No.: 13/861,812

(22) Filed: Apr. 12, 2013

(65) Prior Publication Data
US 2013/0266754 A1 Oct. 10, 2013

Related U.S. Application Data

(62) Division of application No. 12/323,971, filed on Nov. 26, 2008, now Pat. No. 8,440,036.

(30) Foreign Application Priority Data

Nov. 26, 2007 (GB) .................... 0723077.4

(51) Int. Cl.
B32B 7/00 (2006.01)
B29C 53/82 (2006.01)
(Continued)

(52) U.S. Cl.
CPC ............... A41D 27/24 (2013.01); Y10T 428/19 (2015.01); B29C 65/02 (2013.01); B29C 65/62 (2013.01);
(Continued)

(58) Field of Classification Search
CPC ........ B29C 65/00; B29C 65/02; B29C 65/08; B29C 65/44; B29C 65/48; B29C 65/4815; B29C 65/5057; B29C 65/62; B29C 65/72; B29C 66/1122; B29C 66/43; B29C 66/729; B29C 66/21; A41D 27/24; A41D 27/245; B29K 2313/00; D06H 5/00; B32B 5/26

USPC ........ 156/60, 66, 70, 73.1, 73.2, 73.4, 91, 92, 156/93, 148, 155, 157, 166, 168, 176, 177, 156/178, 179, 196, 199, 200, 201, 204, 227, 156/229, 250, 290, 291, 308.2, 308.4, 156/308.6, 324; 2/275

See application file for complete search history.

(56) References Cited

U.S. PATENT DOCUMENTS 3,424,161 A * 1/1969 Scheier ..................... 604/366
3,649,399 A 3/1972 Nakanishi
(Continued)

FOREIGN PATENT DOCUMENTS

CN 1111489 A 11/1995
CN 1111489 C 6/2003
(Continued)

Primary Examiner — Philip Tucker
Assistant Examiner — Brian R Slawski
(74) Attorney, Agent, or Firm — Dickstein Shapiro LLP

(57) ABSTRACT

A method of joining first and second stretchable fabric portions to one another in a desired configuration comprises the steps of sewing a first thread through at least one of the first and second fabric portions to define a first stitch formation looping a second thread within the first stitch formation such that the second thread and the first thread overlap one another to create a sewn seam, one of the threads being a fusible thread and the other of the threads being a non-fusible thread; positioning the first and second fabric portions relative to one another in a desired configuration; melting the fusible thread; and forming a plurality of discrete bonding element portions extending along a bonding path. The discrete bonding element portions retain the first and second fabric portions in the desired configuration.

2 Claims, 13 Drawing Sheets

(51) Int. Cl.
  *B29C 65/00* (2006.01)
  *B32B 37/00* (2006.01)
  *A41D 27/24* (2006.01)
  *B29C 65/02* (2006.01)
  *B29C 65/62* (2006.01)
  *B29C 65/72* (2006.01)
  *B29K 77/00* (2006.01)
  *B29K 101/12* (2006.01)

(52) U.S. Cl.
  CPC ............ *B29C 65/72* (2013.01); *B29C 66/0324* (2013.01); *B29C 66/1122* (2013.01); *B29C 66/13* (2013.01); *B29C 66/135* (2013.01); *B29C 66/21* (2013.01); *B29C 66/43* (2013.01); *B29C 66/69* (2013.01); *B29C 66/729* (2013.01); *B29K 2077/00* (2013.01); *B29K 2101/12* (2013.01); *B29K 2313/00* (2013.01); *B29C 66/431* (2013.01); *B29C 66/472* (2013.01)

(56) References Cited

U.S. PATENT DOCUMENTS

| | | | |
|---|---|---|---|
| 3,690,277 | A | 9/1972 | Baxter et al. |
| 4,662,874 | A | 5/1987 | Korpman |
| 6,436,083 | B1 | 8/2002 | Mishima et al. |
| 2002/0161348 | A1 | 10/2002 | Mishima et al. |
| 2003/0221765 | A1* | 12/2003 | Guilhem et al. ............... 156/93 |
| 2005/0188907 | A1 | 9/2005 | D'Henin |

FOREIGN PATENT DOCUMENTS

| | | |
|---|---|---|
| CN | 2563170 Y | 7/2003 |
| FR | 2 850 539 A1 | 8/2004 |

\* cited by examiner

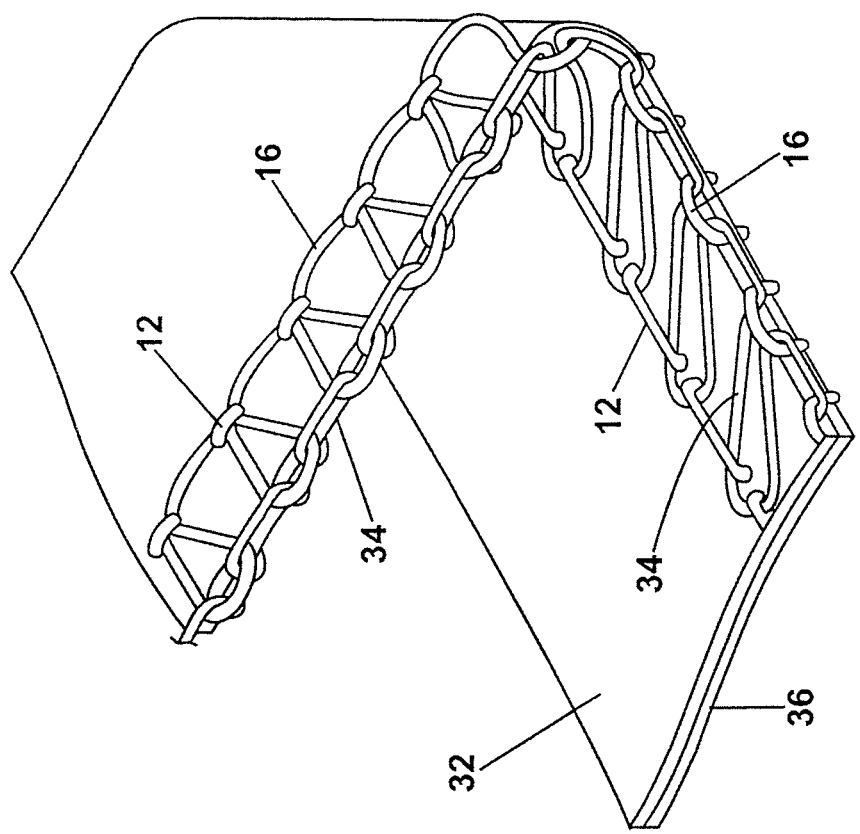

JOINING STRETCHABLE FABRIC PORTIONS TO ONE ANOTHER

This application is a divisional of U.S. patent application Ser. No. 12/323,971, filed Nov. 26, 2008, now U.S. Pat. No. 8,440,036, which is hereby incorporated by reference in its entirety.

This invention relates to a method of joining first and second stretchable fabric portions to one another in a desired configuration, a fabric construction comprising first and second fabric portions joined to one another in a desired configuration, and a garment comprising such a fabric construction.

In garment manufacture it is often necessary to join two fabric portions to one another, in a desired configuration to create a garment. Any such join between fabric portions must be sufficiently strong to maintain the fabric portions in the desired configuration during, for example wearing or washing of the garment.

It is known to join two fabric portions to one another in a desired configuration using a stitch formation in which one or more sewing threads is sewn through both fabric portions to join the fabric portions together.

However, imbuing such conventional stitch formations with sufficient strength to withstand wear and washing results in a bulky join or seam. The inclusion of a bulky seam in a garment is undesirable, particular in intimate apparel such as underwear or tights which are worn next to a wearer's skin, since the bulky seam can make the garment uncomfortable.

As an alternative to conventional stitch formations, a fusible thread may be used to bond one fabric portion to another.

The structure of a fusible thread, for example one formed from a thermoplastic yarn such as copolyamide, or a thermosetting yarn, undergoes a molecular change when heated and melts to form a bonding agent. Subsequent cooling causes the bonding agent to set. Accordingly it is possible to use the fusible thread like an adhesive to bond two fabric portions together. The join between the two portions formed in this manner is less bulky than a seam formed by conventional stitch formations.

However, when set the bonding agent is brittle, and so any deformation of the respective fabric portions causes the bonding agent to shatter. This reduces the extent of bonding between the fabric portions, and so allows the two portions to separate.

Therefore, there is a need for an improved manner of joining two stretchable fabric portions to one another in a desired configuration that produces an unobtrusive join of sufficient strength which is able to accommodate stretching of the fabric portions.

According to a first aspect of the invention there is provided a method of joining first and second stretchable fabric portions to one another in a desired configuration comprising the steps of:
sewing a first thread through at least one of the first and second fabric portions to define a first stitch formation;
looping a second thread within the first stitch formation such that the second thread and the first thread overlap one another to create a sewn seam, one of said threads being a fusible thread and the other of said threads being a non-fusible thread;
positioning the first and second fabric portions relative to one another in a desired configuration; and
melting the fusible thread; and
forming a plurality of discrete bonding element portions extending along a bonding path, the discrete bonding element portions retaining the first and second fabric portions in the desired configuration.

The provision of a plurality of discrete bonding element portions allows the bonding element portions to move relative to one another. This permits the bonding element portions to accommodate stretching of the fabric portions without shattering, thereby maintaining the extent of bonding between the fabric portions, and so preventing the fabric portions from separating.

In addition the inclusion of a fusible second thread within the first stitch formation introduces a chemical bonding element to the join between the two fabric portions, and so permits the use of a first thread having a low yarn count, and hence a low bulk, while maintaining the strength of the join between the fabric portions. In turn, a low bulk first thread reduces the bulk of the first stitch formation, and no provides an unobtrusive join between the fabric portions.

In a preferred embodiment of the invention, sewing a first thread includes sewing a non-fusible first thread through the first fabric portion to define the first stitch formation; and
positioning the first and second fabric portions relative to one another includes positioning the first and second fabric portions relative to one another so as to adopt a first overlying configuration with a fusible second thread lying between the first and second fabric portions.

In another preferred embodiment of the invention, sewing a first thread includes sewing a non-fusible first thread through the first and second fabric portions to define a first stitch formation; and
positioning the first and second fabric portions relative to one another includes positioning the first and second fabric portions relative to one another so as to adopt a second overlying configuration with a fusible second thread lying between respective regions of one of the first or second fabric portions.

In a further preferred embodiment of the invention, sewing a first thread includes sewing a first thread through the first and second fabric portions to define a first stitch formation; and
positioning the first and second fabric portions relative to one another includes positioning the first and second fabric portions relative to one another so as to adopt an open configuration with the first and second fabric portions extending in opposite directions away from the first stitch formation.

The foregoing steps permit the relative positioning of the first and second fabric portions in each of the first and second overlying configuration and the open configuration, respectively, as desired.

Preferably looping a sewing looper thread within the first stitch formation includes feeding the fusible looper thread and the sewing looper thread through the same looper member. Such a step conveniently lays the foregoing looper threads into the first stitch formation is the desired parallel arrangement.

Preferably the method further includes the step of looping a third thread between the first thread and the second thread. The looping of a third thread in this way provides additional support to the first stitch formation, thereby increasing the robustness thereof. In addition, the third thread may absorb the melted fusible second thread where it overlaps the second thread. This increases the number of discrete bonding element portions in a controlled and regular manner, and so allows them to accommodate further stretching of the fabric portions while maintaining the extent of bonding between the fabric portions.

The method may include arranging the threads in an overlook stitch configuration having a needle thread, one or more lower looper threads, and an upper looper thread.

Arranging the threads in this manner allows for the finishing of an edge of at least one of the first and second fabric portions while providing the desired joining of the fabric portions to one another.

Optionally the method includes arranging the threads in an ISO 504 overlook stitch configuration with the first sewing thread defining the needle thread, the second thread is defining a lower looper thread, and the third thread defining the upper looper thread.

Another embodiment of the method includes arranging the threads in an ISO 505 overlock stitch configuration with the first sewing thread defining the needle thread, the second thread defining a lower looper thread, and the third thread defining the upper looper thread.

Such steps provide one or more of the fabric portions with desirable finished edge characteristics while joining the fabric portions to one another.

Optionally the fusible thread is lad within the sewn seam together with a non-fusible fourth thread such that the fourth thread and the fusible thread lie parallel to one another.

The looping of a fourth thread together with the fusible thread provides additional support to the discrete bonding elements portions, thereby increasing the robustness of the join between the fabric portions, without impacting on the discrete nature of these elements.

Conveniently the fusible thread is a composite thread comprising a core non-fusible thread about which is wound a fusible yarn. Such a composite thread increases the robustness of the join between the fabric portions without the need to introduce a non-fusible fourth thread.

In a preferred embodiment of the invention after forming the plurality of discrete bonding element portions, one or more non-fusible threads are removed. Such a step reduces further the bulk of any join between the fabric portions. In addition it allows for the removal of a visible means, i.e. the non-fusible thread, of joining fabric portions from, e.g. a garment formed from the fabric portions.

According to a second aspect of the invention there is provided a fabric construction comprising:

first and second stretchable fabric portions joined to one another in a desired configuration; and
a plurality of discrete bonding element portions formed from a fusible thread, the discrete bonding element portions extending along a bonding path and retaining the first and second fabric portions in the desired configuration.

According to a third aspect of the invention there is provided a garment comprising a fabric construction as described hereinabove.

The second and third aspects of the invention share the advantages of the first aspect of the invention.

There now follows a brief description of preferred embodiments of the invention, by way of non-limiting examples, with reference to the accompanying drawings in which:

FIG. 1(a) schematically shows, from below, a stitch structure formed by a method according to a first embodiment of the invention;

Figure 5A:
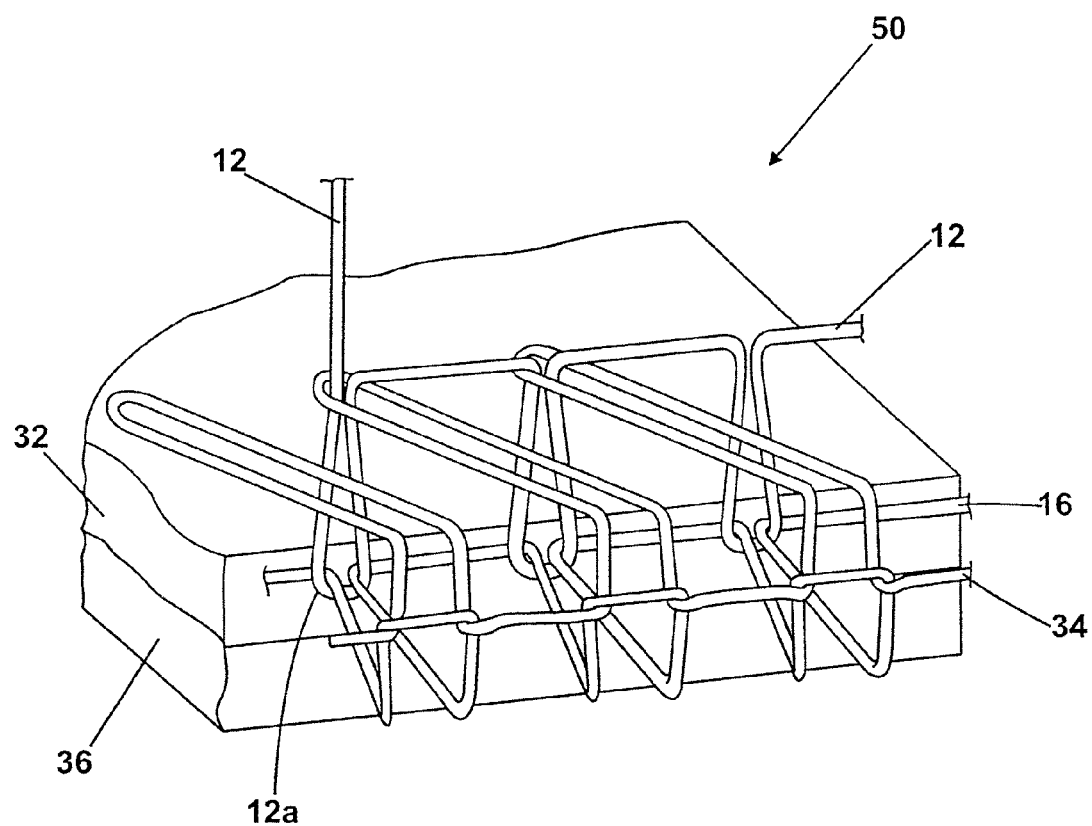
Figure 5C:
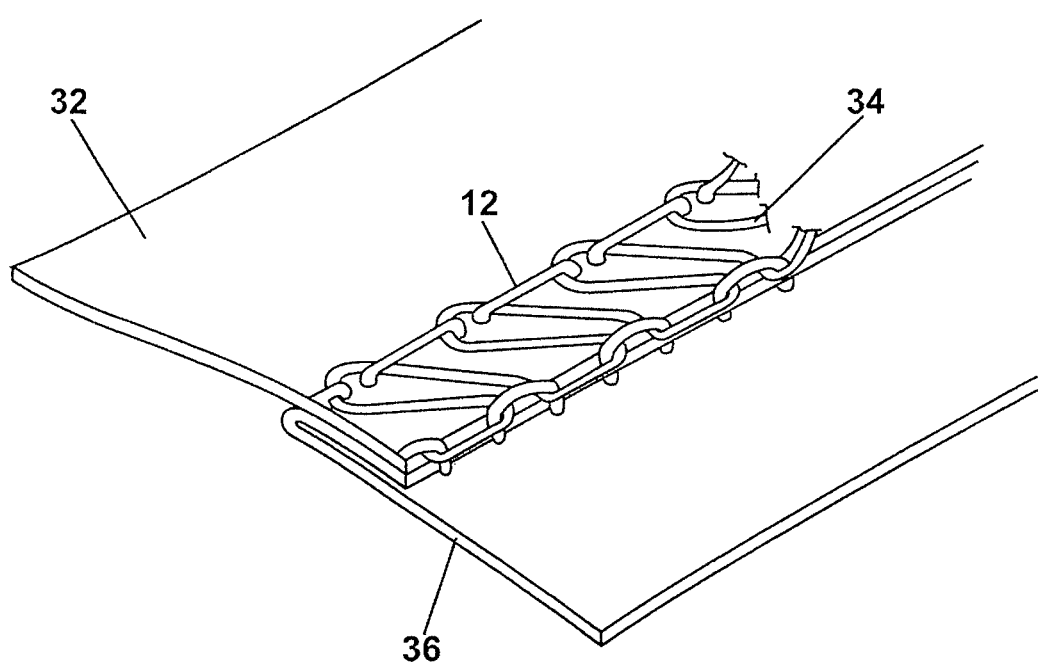
Figure 6A:
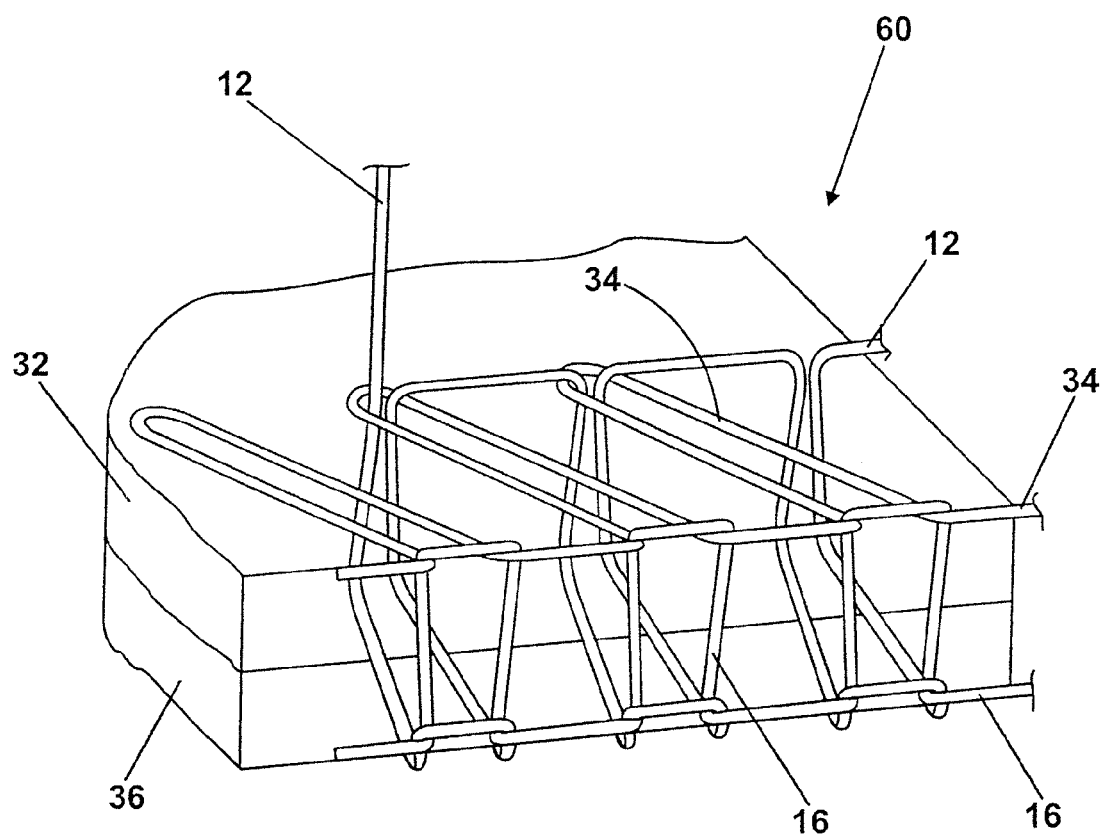
Figure 6B:
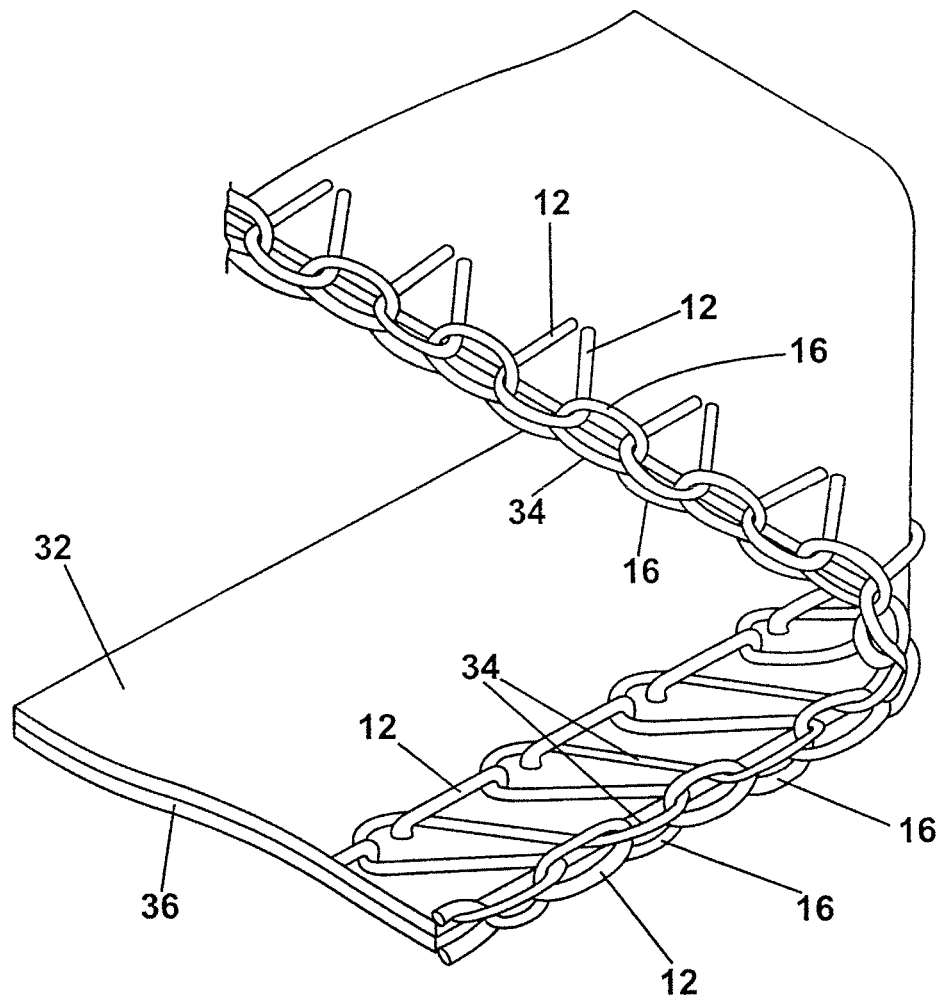
Figure 6C:
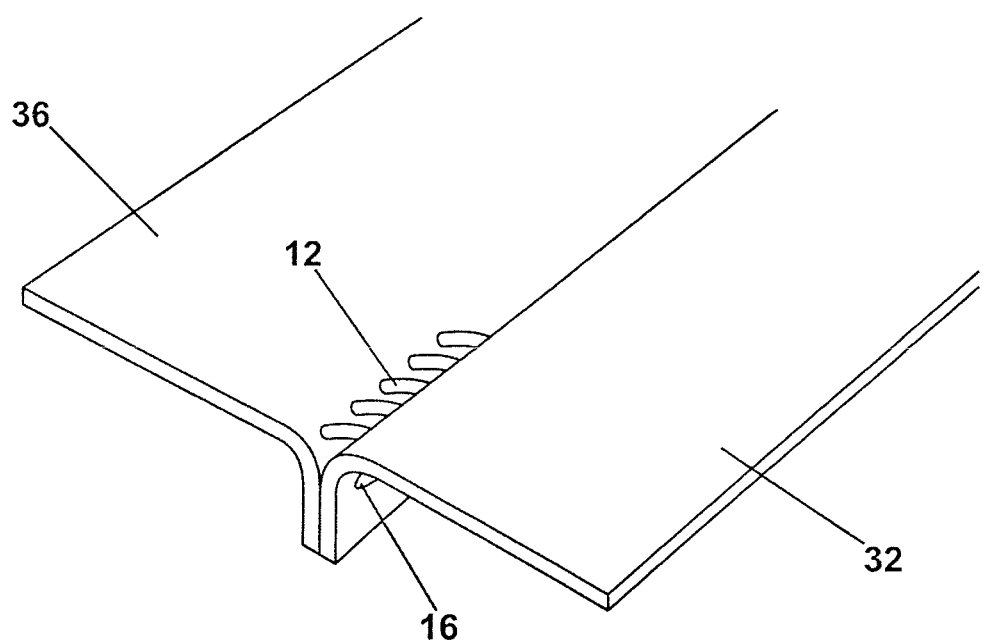
Figure 7A:
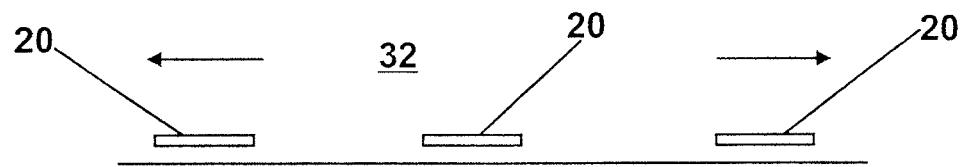
Figure 7B:
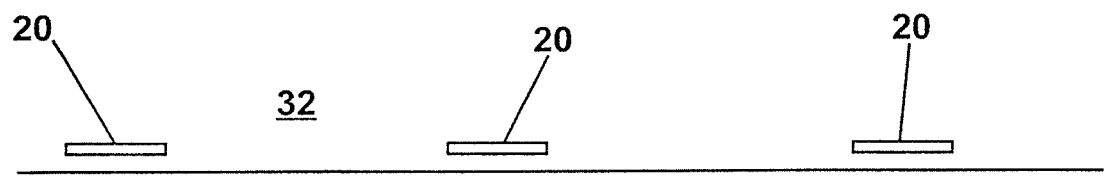

FIGS. 5(a) and 5(b) show a stitch structure formed by a method according to a fourth embodiment of the invention;

FIG. 5(c) shows first and second fabric portions in a second overlying configuration;

FIGS. 6(a) and 6(b) show a stitch structure formed by a method according to a fifth embodiment of the invention;

FIG. 6(c) shows first and second fabric portions in an open configuration;

FIG. 7(a) shows a further schematic view of discrete bonding element portions while respective fabric portions are in a relaxed state; and FIG. 7(b) shows a schematic view of the discrete bonding element portions shown in FIG. 7(a) while respective fabric portions are in a stretched state.

Figure 1A:
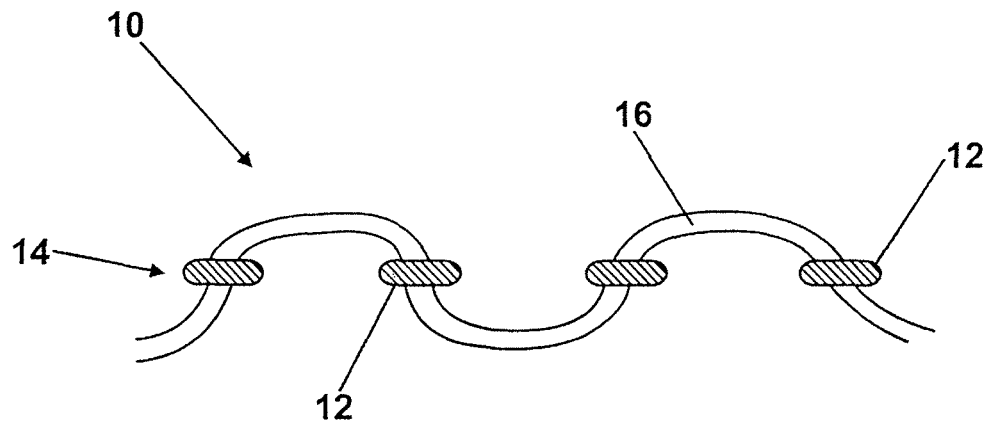
FIG. 1(b) is a side view of the stitch structure shown in FIG. 1(a)
FIG. 1(c) shows the stitch structure shown in FIG. 1(a) following melting of a fusible second thread therein.
FIG. 1(d) shows the stitch structure of FIG. 3 after removal of the first thread therein.

A schematic view of a stitch structure formed by a first embodiment of the method of the to invention is designated generally by the reference numeral 10, as shown in FIG. 1(a).

Figure 1B:
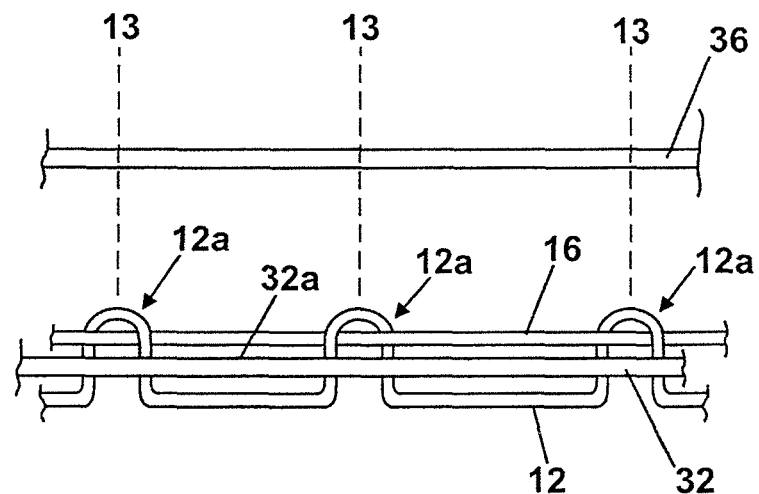

The first stitch structure 10 is a simple two thread sewn seam formed by sewing a non-fusible first thread 12 through a first stretchable fabric portion 32 (FIG. 1(b)) to define a first stitch formation 14, and by looping a fusible second thread 16 within the first stitch formation 14 such that the fusible second thread 16 and the first thread 12 overlap one another. This is indicated more clearly in FIG. 1(b) wherein it will be noted that the second thread 16 extends across a surface 32a of the first fabric portion 32 in face contact therewith and at discrete locations 13 along the second thread 16 the first thread 12 is formed into bridge-like formations 12a each of which overlies the second thread 16 in a bridge like manner.

Figure 1C:
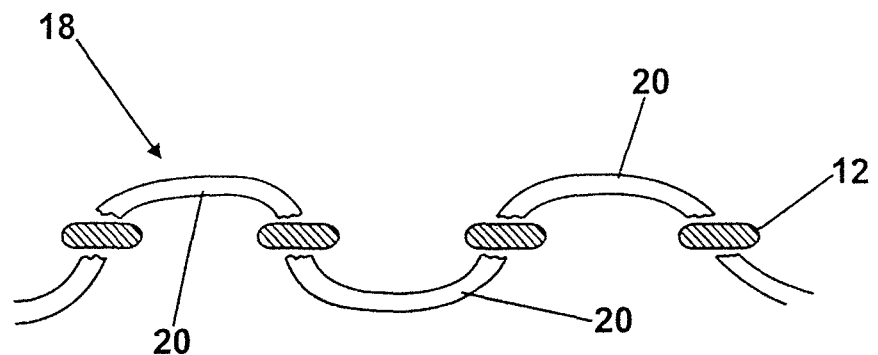
Figure 1D:
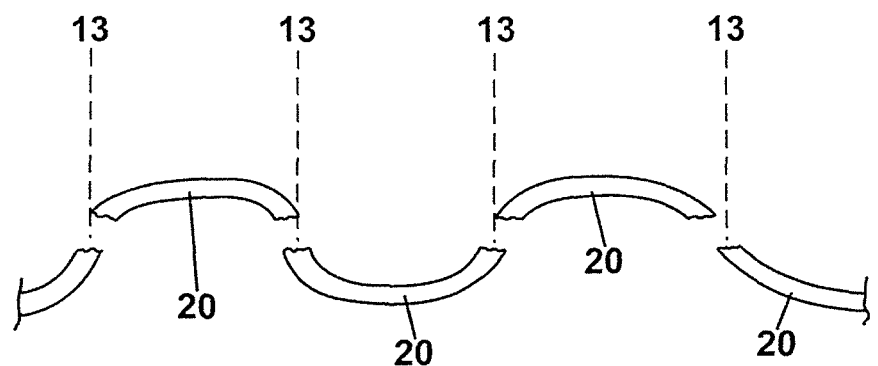

In accordance with the present invention, a second fabric portion 36 is to be secured to the first fabric portion 32. This is achieved as illustrated in FIG. 1(b) by positioning the second fabric portion 36 over the first fabric portion 32 with the second thread 16 located therebetween. The fabric portions 32, 36 are then held together while the fusible second thread 15 is melted, using heat for example, and a plurality of discrete bonding element portions 20, as shown in FIG. 1(c) are formed. The discrete bonding element portions 20 extend along a bonding path 18 and bond the fabric portions 32, 36 together, and thereby retain the fabric portions 32, 36 in the desired configuration.

The bridge-like formations 12a are located between the second thread 16 and the second fabric portion 36 at locations 13 and so during melting of the fusible second thread 16 act to shield the fusible second thread 16 from the second fabric portion 36 in order to prevent or weaken bonding of the first and second fabric portions 32, 36 at these locations and also, as seen more clearly in FIG. 1(c), create the discrete bonding element portions 20 from the melted second thread 16 (each bonding element portion 20 extending between adjacent locations 13).

Accordingly the formation of the discrete bonding element portions 20 is achieved by the bridge-like formations 12a of the non-fusible first thread 12 causing the melted second thread 16 to flow away from and/or be absorbed into the non-fusible thread 12 and thereby create points of weakness in the melted second thread 16. Optionally the melted second thread 16 may be further made to flow away from the non-fusible first thread 12 by additionally applying pressure to the fabric portions 32, 36.

The creation of the aforementioned points of weakness allows the melted fusible second thread 16 to break in preference at these points of weakness (rather than shatter) to create the plurality of discrete bonding element portions 20. Subsequent stretching and/or mechanical deformation of the fabric portions 32, 36 can be used to form the plurality of discrete bonding element portions 20.

In other embodiments the action of melting the fusible second thread 16 may be sufficient to sever the melted fusible second thread 16 completely to form directly the plurality of discrete bonding element portions 20.

These discrete bonding element portions 20 retain the first and second stretchable fabric portions 32, 36 in a desired relative configuration.

In accordance with the present invention, the discrete bonding element portions 20 are able to move relative to one another; in this respect adjacent element portions 20 are able to pivot relative to one another at locations 13 and/or are able to move apart from one another at these locations. This movement between adjacent bonding element portions 20 accommodates stretching of the joined together fabric portions 32, 36.

The fusible thread may be formed completely from a heat settable plastics material such as a polyamide, for example, Grilon K-110 having a yarn count of about 235 dtex.

This can be advantageous since it enables, if desirable, the non-fusible first thread 12 to be removed since, after melting, the second thread 16 no longer exists at locations 13. This provides a bonded connection between the fabric portions 32, 36 which is relatively invisible (i.e. there is no visible thread giving the appearance of a sewn seam) and which is less bulky than a conventional sewn seam.

As seen in FIGS. 1(a) and 1(c) the relative orientation between bonding element portions 20 is determined by the 'bridging' first thread 12; this orientation can be modified to accommodate desirable stretching characteristics of the joined fabric portions 32, 36. Examples of so modifying the orientation of bonding element portions 20 are given in the following embodiments.

Figure 2A:
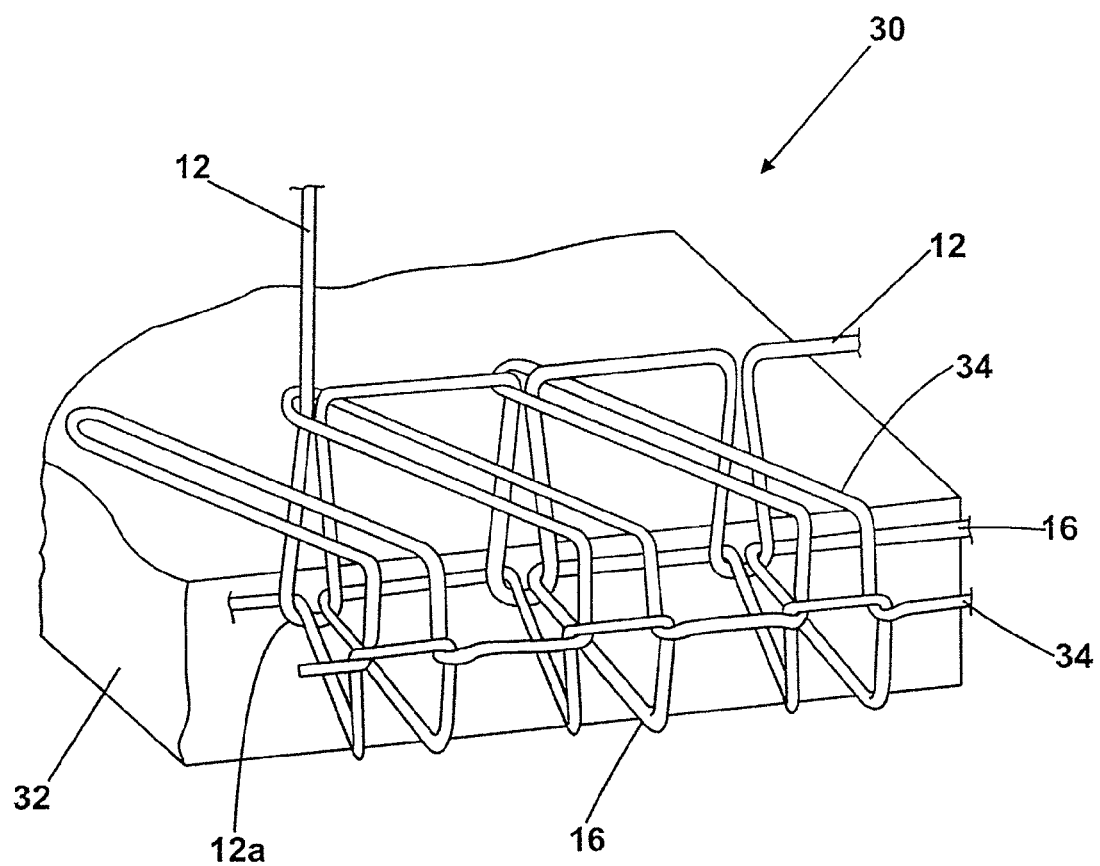
FIG. 2(a) shows a stitch structure formed by a method according to a second embodiment of the invention.

FIG. 2(a) shows a second stitch structure 30 formed by a second embodiment of the method of the invention.

The second stitch structure 30 is formed by sewing a non-fusible first thread 12 through a first fabric portion 32 to define a first stitch formation 14, and by looping a fusible second thread 16 within the first stitch formation 14 such that the fusible second thread 16 and the first thread 12 overlap one another.

In addition, a non-fusible third thread 34 is looped between the first thread 12 and the fusible second thread 16.

The first and third threads 12, 34 and the fusible second thread 16 are arranged in an overlook stitch configuration, and more particularly in an International Standards Organisation (ISO) 504 stitch configuration. In this configuration the first thread 12 defines the needle thread, the fusible second thread 16 defines a lower looper thread, and the third thread 34 defines the upper looper thread.

Other embodiments of the method of the invention my produce a stitch structure having a differing stitch configuration.

Figure 2B:
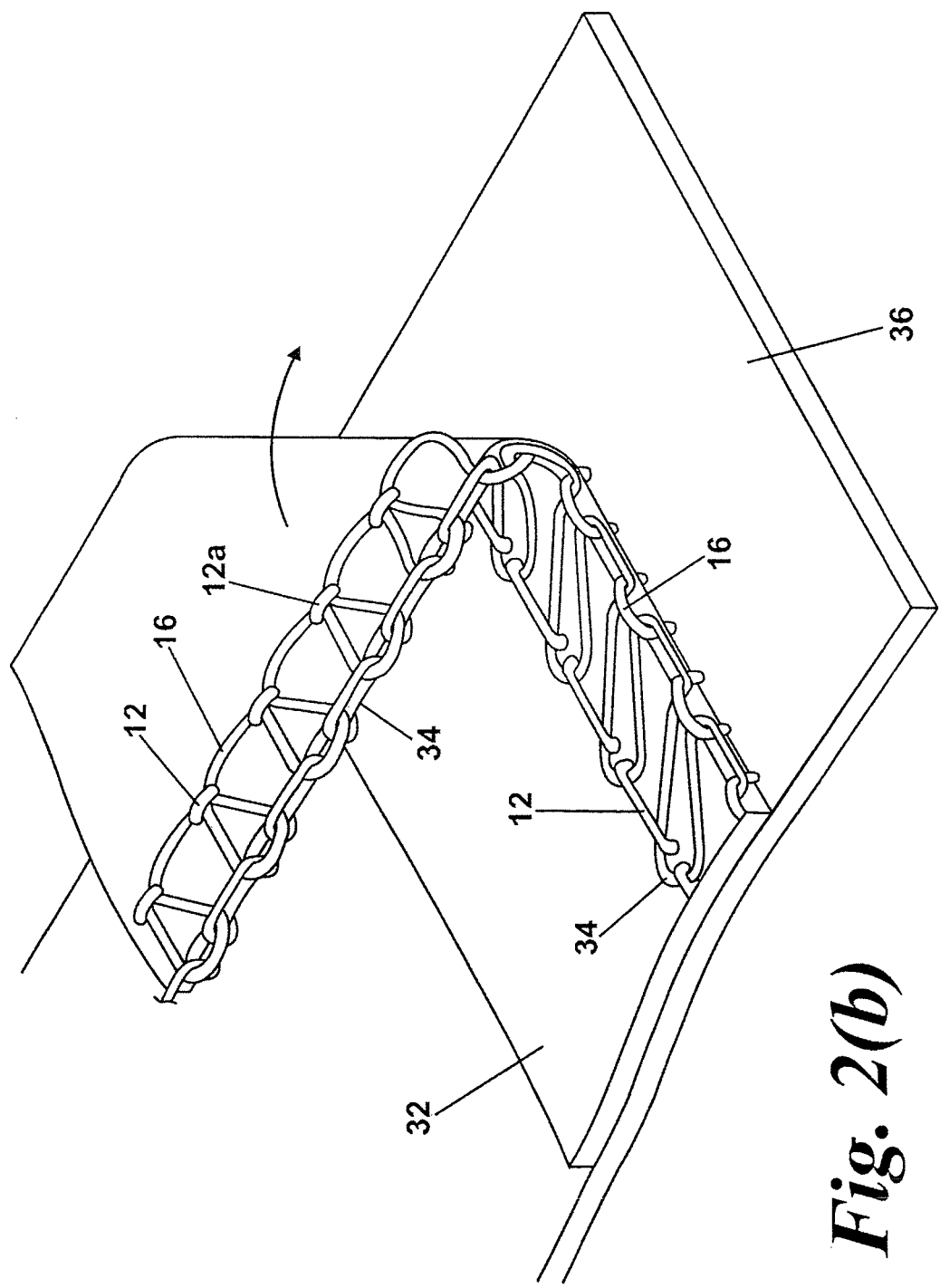
FIG. 2(b) shows first and second fabric portions in a first overlying configuration.

Following formation of the aforementioned stitch configuration, the first fabric portion 32 is positioned relative to a second stretchable fabric portion 36 in a first overlying configuration, as shown in FIG. 2(b), with the fusible second thread 16 lying between the first and second fabric portions 32, 36.

The fusible second thread 16 is now melted using, for example, a heat press to form a plurality of discrete bonding element portions (not shown).

Figure 3A:
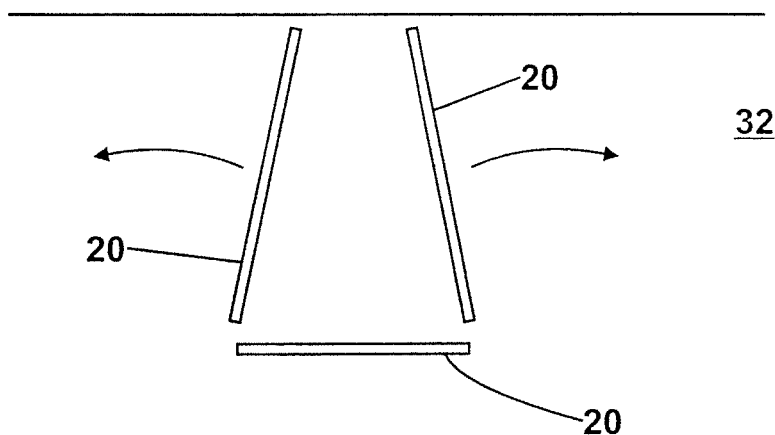
FIG. 3(a) shows a schematic view of discrete bonding element portions while respective fabric portions are in a relaxed state.
Figure 3B:
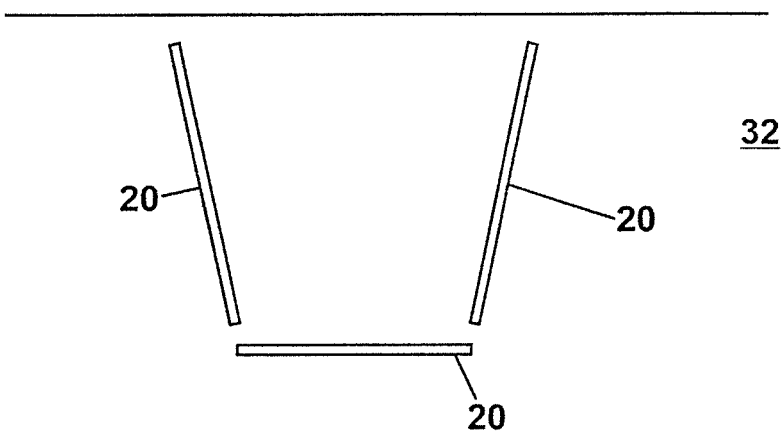
FIG. 3(b) shows a schematic view of discrete bonding element portions while respective fabric portions are in a stretched state.

In particular, the first and third threads 12, 34 act on the fusible second thread 16 where they overlap to create a plurality of discrete bonding element portions 20 extending along a bonding path 18, as shown schematically in FIGS. 3(a) and 3(b).

The discrete bonding element portions 20 join the first and second fabric portions 32, 36 to one another, and so retain them in the desired, first overlying configuration.

The first and third threads 12, 34 may act on the second thread 16 by absorbing the melted second thread 16, or by severing the melted second thread 16 where they overlap. Alternatively the first and third threads 12, 34 may deform the second thread 16 where they overlap to create points of weakness that break in preference to shattering of the melted second thread 16.

FIG. 3(a) shows the relative arrangement of the discrete bonding element portions 20 while the first fabric portion 32 and the second fabric portion (not shown) are in a relaxed, i.e. un-stretched, state.

The discrete bonding element portions 20 are able to move relative to one another, and so are able to accommodate stretching of the first 32 and second fabric portions by moving away from one another, as shown in FIG. 3(b).

Figure 4:
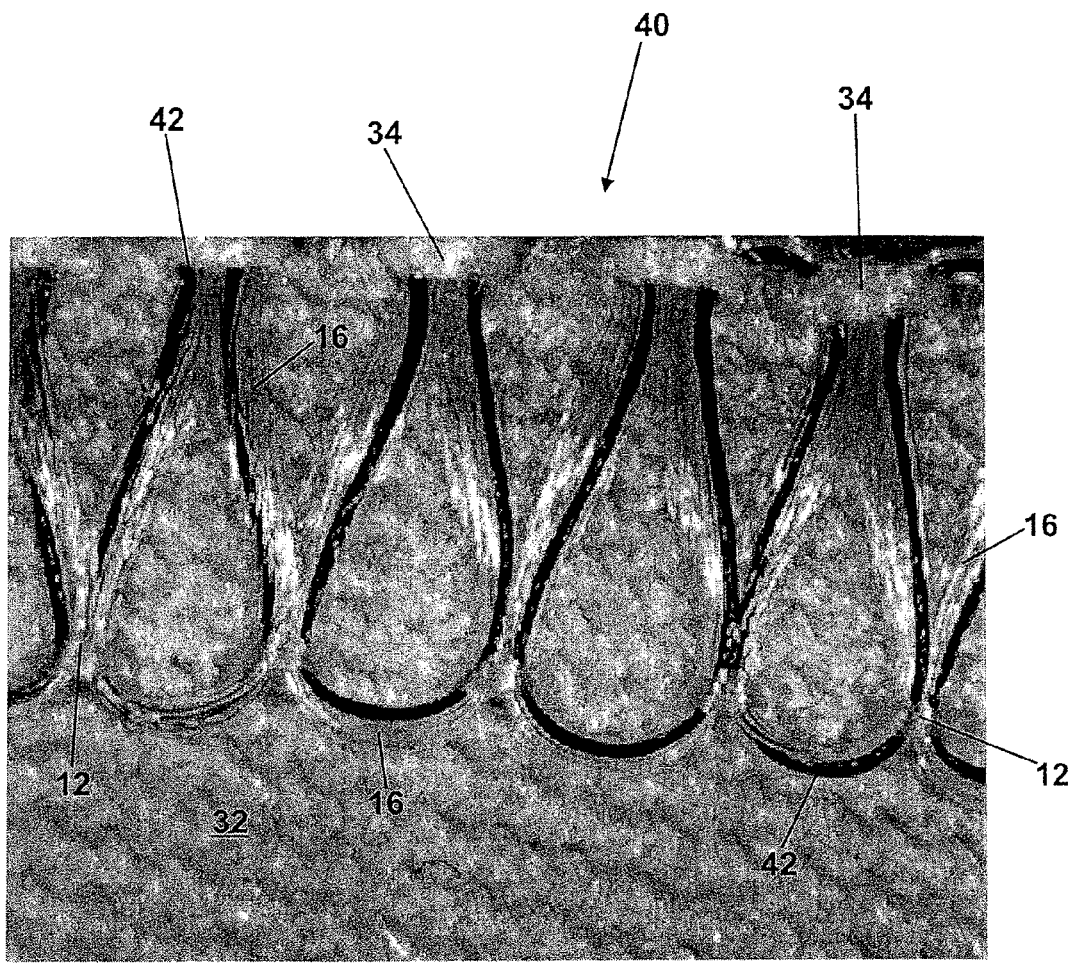
FIG. 4 shows an enlarged view of a stitch structure formed by a method according to a third embodiment of the invention.

FIG. 4 shows an enlarged view of a third stitch structure 40 formed by a third embodiment of the method of the invention.

The third stitch structure 40 is identical to the second stitch structure 30, except that while looping a fusible second thread 16 within the first stitch formation 14 a fourth thread 42 is also looped within the first stitch formation 14 so as to lie parallel with the fusible second thread 16. The fourth thread 42 provides additional support to the discrete bonding element portions (not shown) following melting of the fusible second thread 16.

A convenient way of looping the fourth thread 42 with the fusible second thread 16 is to feed the second and fourth threads 16, 42 through the same looper member (not shown).

Preferably the type of yarn chosen for the fourth thread 42 is resistant to the melted second thread 16, and no minimises any absorption of the discrete bonding element portions 20 formed from the second thread 16.

The third stitch structure 40 functions in the same manner as described hereinabove in relation to the second stitch structure 30.

FIGS. 5(a) and 5(b) show a fourth stitch structure 50 formed by a fourth embodiment of the method of the invention The fourth stitch structure 50 is formed by sewing a first thread 12 through first and second fabric portions 32, 36 to define a first stitch formation 14, looping a fusible second thread 16 within the first stitch formation 14 such that the fusible second thread 16 and the first thread 12 overlap one another, and looping a third thread 34 between the first thread 12 and the fusible second thread 16.

The first and third threads 12, 34 and the fusible second thread 16 are arranged in the International Standards Organisation (ISO) 504 stitch configuration, with the first thread 12 defining the needle thread, the fusible second thread 16 defining the lower looper thread, and the third thread 34 defining the upper looper thread.

Following formation of the aforementioned stitch configuration, the first fabric portion 32 is positioned relative to a second stretchable fabric portion 36 in a second overlying configuration, as shown in FIG. 5(c), with the fusible second thread 16 lying between respective regions of the second fabric portion 36.

In other embodiments of the invention the fusible second thread 16 may lie between respective regions of the first fabric portion 32.

The fusible second thread 16 is now melted to form a plurality of discrete bonding element portions (not shown).

The plurality of discrete bonding element portions 20, as shown schematically in FIGS. 3(a) and 3(b), may be formed by any of the mechanisms described hereinabove.

The discrete bonding element portions 20 join the respective regions of the second fabric portion 36 to one another, and so retain the first and second fabric portions 32, 36 in the desired, second overlying configuration.

The fourth stitch structure 50 may also include a sewing fourth thread (not shown) which is looped within the first stitch formation so as to lie parallel with the fusible second thread 16.

FIGS. 6(a) and 6(b) show a fifth stitch structure 60 formed by a fifth embodiment of the method of the invention The fifth stitch structure 60 is formed by sewing a first thread 12 through first and second fabric portions 32, 36 to define a first stitch formation 14, looping a fusible second thread 16 within the first stitch formation 14 such that the fusible second thread 16 and the first thread 12 overlap one another, and looping a third thread 34 between the first thread 12 and the fusible second thread 16.

The first and third threads 12, 34 and the fusible second thread 16 are arranged in the International Standards Organisation (ISO) 505 stitch configuration. The first thread 12 defines the needle thread, the fusible second thread 16 defines the lower looper thread, and the third thread 34 defines the upper looper thread.

In other embodiments of the invention the threads 12, 16, 34 may be arranged in a different configuration.

The fifth stitch structure 60 may also include a fourth thread (not shown) which is looped within the first stitch formation so as to lie parallel with the fusible second thread 16.

Following formation of the aforementioned stitch configuration, the first fabric portion 32 is positioned relative to a second stretchable fabric portion 36 in an open configuration, as shown schematically in FIG. 6(c), with the first and second fabric portions 32, 36 extending in opposite directions away from the first stitch formation 14.

The fusible second thread 16 is now melted and a plurality of discrete bonding element portions formed (not shown)

In the embodiment shown the first and third threads 12, 34 absorb the fusible second thread 16 where they overlap the fusible second thread 16, thereby forming a plurality of discrete bonding element portions 20 extending along a bonding path 18, as shown schematically in FIGS. 7(a) and 7(b).

The discrete bonding element portions 20 prevent pulling out of the first and third sewing threads 14, 34 from the first stitch structure 14, and so retain the first and second fabric portions 32, 36 in the desired, open configuration.

FIG. 7(a) shows the relative arrangement of the discrete bonding element portions 20 formed by the fifth method of the invention. In this figure the arrangement of the discrete bonding element portions 20 is shown while the first fabric portion 32 and the second fabric portion (not shown) are in a relaxed, i.e. un-stretched state.

The discrete bonding element portions 20 are able to move relative to one another, and so are able to accommodate stretching of the first 32 and second fabric portions by moving away from one another, as shown in FIG. 7(b).

In the above examples, the fusible thread 16 is preferably formed from a heat settable plastics material such as a polyamide. A suitable thread is a Grilon® K-110 having a yarn count of about 235 dtex. Alternatively, the fusible thread 16 may be a composite yarn having a fusible yarn wrapped about a non-fusible core thread. A suitable composite yarn is for example Hemsafe 4002 as supplied by Wykes.

In the above examples, the non-fusible thread is preferably a multifilament polyester having a yarn count in the range of 80-150 dtex. A suitable yarn is Skala 240 or 360 as supplied by Gutermann.

The invention claimed is:

1. A fabric construction comprising:
   first and second stretchable fabric portions joined to one another in a desired overlying configuration; and
   a plurality of discrete bonding element portions formed from a fusible thread and lying between respective fabric portions, the discrete bonding element portions being separated and spaced from one another by a non-fusible thread arranged in a first stitch formation, the discrete bonding element portions extending along a bonding path, and the discrete bonding element portions adhering the first and second fabric portions in the desired overlying configuration.

2. A garment comprising a fabric construction, and wherein the fabric construction comprises:
   first and second stretchable fabric portions joined to one another in a desired overlying configuration; and
   a plurality of discrete bonding element portions formed from a fusible thread and lying between respective fabric portions, the discrete bonding element portions being separated and spaced from one another by a non-fusible thread arranged in a first stitch formation, the discrete bonding element portions extending along a bonding path, and the discrete bonding element portions adhering the first and second fabric portions in the desired overlying configuration.

* * * * *